United States Patent [19]
Upp

[11] Patent Number: 6,104,724
[45] Date of Patent: *Aug. 15, 2000

[54] ASYNCHRONOUS DATA TRANSFER AND SOURCE TRAFFIC CONTROL SYSTEM

[75] Inventor: Daniel C. Upp, Southbury, Conn.

[73] Assignee: Transwitch Corp., Middlebury, Conn.

[*] Notice: This patent is subject to a terminal disclaimer.

[21] Appl. No.: 08/961,932

[22] Filed: Oct. 29, 1997

Related U.S. Application Data

[63] Continuation of application No. 08/123,881, Sep. 20, 1993.

[51] Int. Cl.[7] .......................................................... H04J 3/16
[52] U.S. Cl. .......................... 370/458; 370/392; 370/395; 370/462
[58] Field of Search ..................................... 370/362, 364, 370/389, 392, 395, 438, 455, 458, 462, 538

[56] References Cited

U.S. PATENT DOCUMENTS

| | | | |
|---|---|---|---|
| 3,982,077 | 9/1976 | Clark et al. | 370/538 |
| 3,985,962 | 10/1976 | Jones et al. | 370/455 |
| 4,149,144 | 4/1979 | Diefenderfer | 340/147 R |
| 4,156,798 | 5/1979 | Doelz | 179/15 AL |
| 4,375,681 | 3/1983 | Abbott et al. | 370/16 |
| 4,460,993 | 7/1984 | Hampton et al. | 370/84 |
| 4,488,293 | 12/1984 | Haussmann et al. | 370/84 |
| 4,660,169 | 4/1987 | Norgen et al. | 364/900 |
| 4,685,101 | 8/1987 | Segal et al. | 370/84 |
| 4,727,536 | 2/1988 | Reeves et al. | 370/84 |
| 4,750,168 | 6/1988 | Trevitt | 370/85 |
| 4,763,320 | 8/1988 | Rudolph et al. | 370/85 |
| 4,789,926 | 12/1988 | Clarke | 364/200 |
| 4,815,074 | 3/1989 | Jacobsen | 370/112 |
| 4,817,037 | 3/1989 | Hoffman et al. | 364/200 |
| 5,084,872 | 1/1992 | LeCucq et al. | 370/94.2 |
| 5,163,048 | 11/1992 | Heutink | 370/85.6 |
| 5,172,373 | 12/1992 | Suzuki | 370/85.11 |
| 5,263,023 | 11/1993 | Sevenhans et al. | 370/85.11 |
| 5,276,678 | 1/1994 | Hendrickson et al. | 370/438 |
| 5,452,330 | 9/1995 | Goldstein | 370/395 |
| 5,901,146 | 5/1999 | Upp | 370/458 |

OTHER PUBLICATIONS

Mitel Corporation 1988 Catalog Table of Contents and pp. 4–151, 4–171, an 5–261 through 5–267.
Intel Corporation 1989 Microprocessor and Peripheral Handbook cover page and pp. 2–222 through 2–240.
PCI Local Bus Specification Revision 2.0 Apr. 30, 1993.

*Primary Examiner*—Douglas W. Olms
*Assistant Examiner*—Shick Hom
*Attorney, Agent, or Firm*—David P. Gordon; David S. Jacobson; Thomas A. Gallagher

[57] ABSTRACT

An asynchronous data transfer and source traffic control system includes a bus master and a plurality of bus users coupled to a bidirectional data bus. The bus master provides two clock signals to each bus user, a system clock and a frame clock. The frame clock designates the start of a frame. A frame format preferably includes fifteen or sixteen system clock cycles, the first of which is designated the request field and the last of which includes a grant field. One or more other cycles may be assigned control and/or routing information and the remainder of the cycles comprise a data field of fixed length. During the request field, any number of bus users may request access which is received by the bus master. During the grant field, the bus master grants access to a selected bus user for the entire data portion of the next frame. Which user is granted access to the next frame is determined according to an arbitration algorithm in the bus master which may be unknown to the bus users. The asynchronous data transfer and source traffic control system has particular application in accommodating the transfer of the contents of ATM cells used in BISDN systems.

20 Claims, 2 Drawing Sheets

| Clock Cycle | 32 BITS | | | |
|---|---|---|---|---|
| 0 | REQUEST FIELD | | | |
| 1 | INTERNAL ROUTING FIELD (OPTIONAL) | | | |
| 2 | A B C D  VPI | | VCI | P T I  CLP |
| 3 | BYTE 3 | BYTE 2 | BYTE 1 | BYTE 0 |
| 4 | BYTE 7 | BYTE 6 | BYTE 5 | BYTE 4 |
| 5 | BYTE 11 | BYTE 10 | BYTE 9 | BYTE 8 |
| 6 | BYTE 15 | BYTE 14 | BYTE 13 | BYTE 12 |
| 7 | BYTE 19 | BYTE 18 | BYTE 17 | BYTE 16 |
| 8 | BYTE 23 | BYTE 22 | BYTE 21 | BYTE 20 |
| 9 | BYTE 27 | BYTE 26 | BYTE 25 | BYTE 24 |
| 10 | BYTE 31 | BYTE 30 | BYTE 29 | BYTE 28 |
| 11 | BYTE 35 | BYTE 34 | BYTE 33 | BYTE 32 |
| 12 | BYTE 39 | BYTE 38 | BYTE 37 | BYTE 36 |
| 13 | BYTE 43 | BYTE 42 | BYTE 41 | BYTE 40 |
| 14 | BYTE 47 | BYTE 46 | BYTE 45 | BYTE 44 |
| 15 | SYSTEM CONTROL | | | GEN G RN AUNMT |

FIG. 3

ASYNCHRONOUS DATA TRANSFER AND SOURCE TRAFFIC CONTROL SYSTEM

This application is a continuation of Ser. No. 08/123,881 filed Sep. 20, 1997.

BACKGROUND OF THE INVENTION

1. Field of the Invention

This invention relates generally to asynchronous data communication among a bus master and a plurality of bus users. More particularly, this invention relates to a bus frame and bus structure for an asynchronous data transfer system which allows a bus master to alter the operational characteristics of the bus without the need for altering the operational characteristics of the bus users.

2. State of the Art

Data communication among a bus master and a plurality of bus users is well known in the art. Such communication systems generally include a bidirectional data bus to which the bus master and all of the bus users are connected. The bus master typically produces at least one synchronizing clock signal which is received by all of the bus users on a clock bus separate from the data bus. One data unit which is equal to the bus width can be transferred onto the bus or off the bus during one clock cycle. While all bus users can transfer data off the bus simultaneously, only one bus user can transfer data onto the bus during any given clock cycle. The bus user (which could be the bus master) transferring data onto the bus is said to have "access" or to be "active". In order to determine which bus user is given access during a given clock cycle, an arbitration procedure is established. Typically, each bus user is assigned a time slot in a fixed number of time slots called a data "frame". The frame which defines bus access may be provided with one or more time slots for the exchange of control information in addition to the time slots which are assigned to data transfer. As the clock cycles are received by all of the bus users via the clock bus, each bus user waits for its assigned time slot and then transfers data to the bus during its assigned cycle.

It is recognized that, particularly in asynchronous data transfer systems, bus users are not always ready to transfer data onto the bus during their assigned time slot. Conversely, other bus users may accumulate data for transfer onto the bus faster than their assigned access to the frame will allow them to transfer the data onto the bus. Consequently, it is often desirable to adjust the access mechanism to allow some users relatively more access than others; i.e., more slots in the frame. Many sophisticated algorithms have been developed for arbitrating bus access. However, these known systems typically require that each bus user be aware of the arbitration scheme so that each bus user can tell how much access it has been allocated.

SUMMARY OF THE INVENTION

It is therefore an object of the invention to provide a bus structure and bus frame format for an asynchronous data transfer system which automatically provides adjustable bus access to all bus users.

It is another object of the invention to provide in an asynchronous data transfer system a bus structure and bus frame format which does not require the bus users to be aware of the arbitration scheme used to arbitrate bus access.

It is a further object of the invention to provide in an asynchronous data transfer system an access identification procedure to determine which bus user has access to the bus at any given time.

It is also an object of the invention to provide in an asynchronous data transfer system a bus structure and bus frame format which allows each of the bus users to request access to the bus and the bus master to grant access to the bus.

In accord with these objects which will be discussed in detail below, the asynchronous data transfer system of the present invention includes a bus master and a plurality of bus users which are coupled to a bidirectional data bus and to a clock bus. The clock bus provides to each bus user a system clock and a frame clock. The system clock is the basic transfer clock of the system (i.e., data is put onto the data bus and taken off the data bus during one system clock cycle), while the frame clock designates the start of a frame. A frame format preferably includes sixteen system clock cycles, a first one of which is designated the request field and a last one of which includes a grant field. One or more other cycles may be assigned control and/or routing information and the remainder of the cycles are assigned to the transfer of data from one particular user onto the bus and off the bus to one or more other users. During the first cycle of each bus frame, a number of bus users may request access, which requests are received by the bus master. During the last cycle of each bus frame, the bus master grants access to a selected bus user for the entire data portion of the next frame. Bus users are thus regularly (once each cell) allowed to request access for the next frame and the bus master is regularly (once each frame) granting access to a selected bus user. Which user is granted access to the next frame is determined according to an arbitration algorithm in the bus master which is unknown to the bus users. The arbitration algorithm may thus be changed at any time by the bus master without informing the bus users. Thus, for example, as traffic conditions on the bus change (as different users request more or less access) the arbitration algorithm can be adjusted accordingly by the bus master to provide the most efficient allocation of bus access.

According to an alternate embodiment of the invention, an additional data clock signal is provided on a third clock bus by the bus user which has been granted bus access. This data clock has a higher rate than the system clock and is driven by the granted bus user during the consecutive data transfer portion of the frame. The use of the additional data clock is particularly useful in high speed applications as the clock and data signals are being generated from the same source, and hence skew can be effectively avoided. In order to avoid a possible conflict between signals on the data bus provided by the bus master and the granted bus user, the additional data clock signal driven by the granted bus user is at an increased clock rate (relative to the system clock). This guarantees that the data transfer is completed before the bus master sends its control information onto the data bus.

Additional objects and advantages of the invention will become apparent to those skilled in the art upon reference to the detailed description taken in conjunction with the provided figures.

BRIEF DESCRIPTION OF THE DRAWINGS

FIG. 3 is a chart showing a representative bus frame according to the invention.

DETAILED DESCRIPTION OF THE PREFERRED EMBODIMENTS

Figure 1:
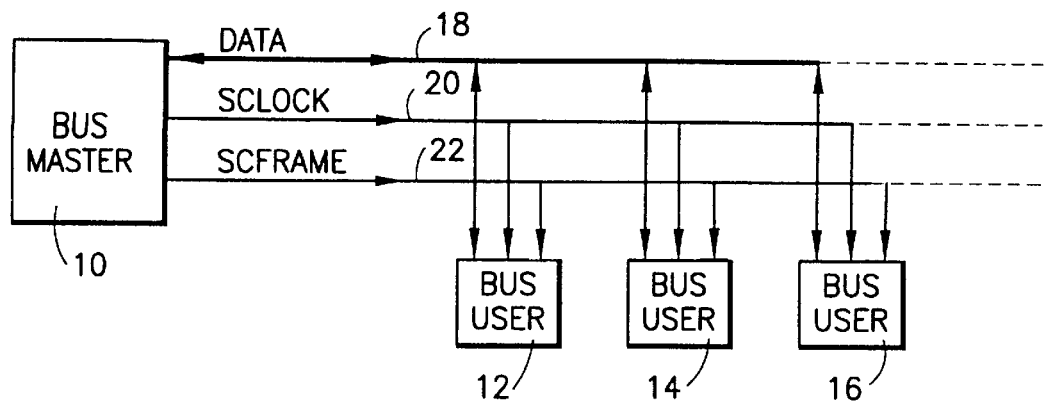
FIG. 1 is a schematic diagram of a first embodiment of the bus structure according to the invention.

Referring now to FIG. 1, a first embodiment of the bus structure of the invention includes a bus master 10 and a plurality of bus users 12, 14, 16 which all are coupled to a bidirectional data bus 18, a system clock bus 20, and a frame clock bus 22. Although only three bus users 12, 14, 16 are shown, it will be appreciated that many bus users can be coupled to the buses 18, 20, 22 as suggested by the dotted lines in FIG. 1. As mentioned above, the data bus 18 is bidirectional to allow any of the bus users 12, 14, 16 and the bus master 10 to transfer data onto or off of the data bus 18. The clock buses 20, 22 are driven by the bus master 10 and are "read only" by all the bus users 12, 14, 16. The data bus 18 is preferably 32-bits wide allowing the transfer of two 16-bit words (4 bytes) during a single cycle of the system clock 20.

Figure 2:
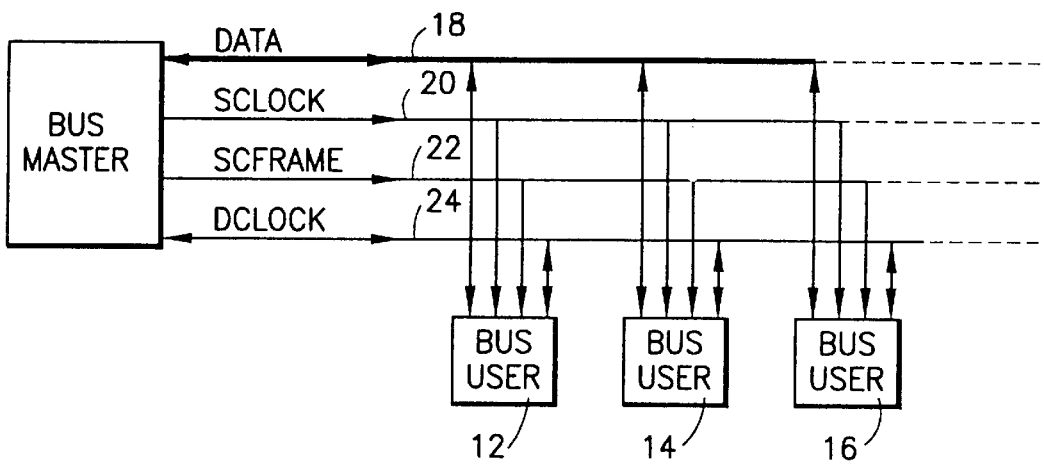
FIG. 2 is a schematic diagram of a second embodiment of the bus structure according to the invention.

According to a second embodiment of the invention which is preferred for high speed applications, the bus structure includes a data clock bus 24 as shown in FIG. 2. The data clock bus 24 is driven by the bus user 12, 14, 16 which is granted access to the data bus, and is read by all of the other bus users 12, 14, 16. As will be discussed in more detail hereinafter, the additional data clock bus 24 is driven at a higher frequency than the system clock bus 20 in order to reduce the variation in delay time between the data driven onto the bus by the granted user and its corresponding clock signal.

In accord with the invention, the structure of the data transfer among bus users 12, 14, 16 or between a bus user and the bus master 10 is accomplished through a bus frame. In the preferred embodiment of the invention, the frame consists of sixteen cycles of the system clock 20. The first cycle of the frame is designated by an active signal on the system frame bus 22. A representative frame according to the invention is shown in FIG. 3.

Before turning to FIG. 3, it should be appreciated that the data transfer format of the bus is designed to accommodate the transfer of the contents of ATM (asynchronous transfer mode) cells used in BISDN (broadband integrated services digital network) systems. The first cycle, driven by the bus users contains the "request" field. The second cycle, driven by one bus user, carries an optional prefix to the ATM cell, which may be used for system-specific purposes, such as an internal cell routing prefix which is used in some ATM swithces. The third cycle, driven by the bus user, carries the first four bytes of the ATM cell, containing cell VPI (virtual path indicator) and VCI (virtual circuit indictor) numbering fields, and the PTI (payload type indicator) and CLP (cell loss priority) fields. The next twelve cycles, also driven by the bus user, carry the forty-eight byte ATM cell payload. The final cycle of the bus frame is driven by the bus master, and contains information regarding which user is granted bus access during the next (succeeding) bus frame.

In particular, and as seen in FIG. 3, during the first clock cycle (0) of the frame, bus users transmit a "request" for access to the next following frame. The requests are transmitted by each user having access to one line of the data bus during clock cycle (0) and raising a flag (i.e., placing a "1" on the data bus) if the user is making a request. The combination of the unique request signals from each of, e.g., thirty-two bus users on the data bus results in a double word which indicates which of the bus users are making a request. For example, if there are thirty-two bus users and all are making a request, the double word will contain all "1's". Of course, if some or none of the users have a request, the double word will take a different form. If there are more than thirty-two bus users and the data bus is thirty-two bits wide, different schemes can be utilized to guarantee proper access of the users to the data bus. These schemes are discussed below. It should also be recognized that instead of having access to only one line, each user could access all lines during the request cycle, but that all but the particular line of interest would be set to zero. Since typical bus implementation utilizes open transistor interfaces pulled to a high voltage state for logic zero, writing a one to an assigned line of a user causes a logic one to be asserted on that line as a low voltage level.

Returning to the bus frame format of FIG. 3, a second clock cycle (1) of the frame is optionally provided for an internal cell routing field as discussed above. The third clock cycle (2) of the frame contains the information fields of the ATM cell header as defined by the BISDN standard as set forth above. Based partially on the BISDN standard, the ATM cell header includes either a 4-bit flow control field ABCD with an 8-bit virtual path indicator VPI, a 16-bit virtual channel indicator VCI, a 3-bit payload type indicator, and a single bit indicator CLP (cell loss priority), or a 12-bit VPI, 16 bit VCI, 3-bit PTI and one bit CLP.

The fourth clock cycle (3) through the fifteenth clock cycle (14) of the bus frame contain the ATM cell "payload". Since each clock cycle permits the placement of a double word (32 bits) which is effectively four bytes onto the data bus, the twelve clock cycles permits forty-eight bytes of data to be placed on the bus by that bus user which received the previous grant.

The final clock cycle (15) of the frame contains information from the bus master identifying which bus user will have access to the next following frame. In a system of thirty-two bus users, the bus user having next access to the frame is identified by a five bit grant number (Grant Num). The validity of the grant number is established by a grant enable bit (GEN). In a system of more than thirty-two bus users, additional system control bits will be used to identify page or group number relating to the request field described above.

As mentioned above, different request schemes may be utilized. For example, requests may be paged to accommodate more than thirty-two bus users. In paged requests, the bus master will enable a certain page during the last cycle of each sequential frame and bus users assigned to the enabled page will make requests during the first cycle of the next following frame. A next page will be enabled during the next frame, and so on until all pages have been enabled and the procedure repeats itself. In addition, the request field may be segmented to include both paged requests and direct requests so that bus users having priority do not have to wait to be paged. Alternatively, the direct request segment of the request field can be associated with a page request whereby all of the bus users assigned to a particular page can request that their page be enabled out of turn. Those skilled in the art will appreciate, with the benefit of the disclosure thus far, that many different request fields can be designed to accommodate objects of the invention wherein each bus user independently requests access to the bus as desired.

Figure 4:
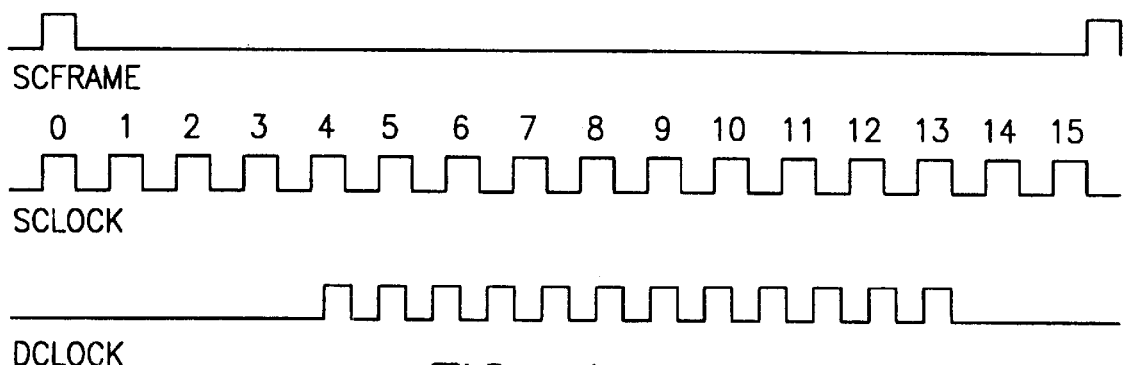
FIG. 4 is a timing diagram showing the three clock signals of the alternate embodiment of the invention.

As mentioned above, the preferred bus frame of the invention is completed in sixteen cycles of the system clock (fifteen if the internal routing field is not utilized) with the frame beginning upon an active signal on the system frame clock bus. FIG. 4 shows a timing diagram illustrating the system cell frame clock bus cycles as compared to the system clock bus cycles. FIG. 4 also shows the cycles of a data clock bus having a higher frequency than the system clock bus in accord with the alternate embodiment of the invention described above with reference to FIG. 2. As seen in FIG. 4, the data clock bus cycles start after the fourth cycle (3) of the frame and continues for twelve cycles at a higher rate that the system clock so that they end before the end of the fifteen cycle (14) of the system clock. In fact, the data clock bus driven by the granted user preferably includes twelve cycles between clock cycles four and thirteen inclusive of the system clock. It will be appreciated from the discussion of the frame above, that it is during these twelve cycles of the data clock bus driven by the granted user that the granted bus user transfers the forty-eight bytes onto the data bus. Using the data clock to drive this forty-eight byte transfer decreases the relative variation between the data on the data bus and its clock signal. In other words, clock/data skew is kept to a minimum. By increasing the data rate of the data clock bus driven by the user, any chance of data collision between ATM cell data provided by the granted user, and the control data placed on the data bus by the bus master is eliminated.

Those skilled in the art will appreciate that during the time between the first cycle of the frame and the last cycle of the frame, the bus master must make a determination as to which bus user will be granted access to the next frame. As mentioned above, it is possible that all of the bus users might request access simultaneously. According to the invention, the requests made by the bus users during the first cycle of the frame are "latched" by the bus master so that the bus users need not repeat requests while waiting to be granted access. Moreover, bus users can register a separate request corresponding to the number of cells-full of data they have to send. Thus, the number of requests registered from each bus user may be used to indicate to the bus master how much data the bus user has to send.

The decision by the bus master to grant access to the next bus frame is made according to an arbitration algorithm. Any of numerous arbitration algorithms may be utilized and they may, if desired, take into account the amount of data a bus user has to send, the priority given to a particular bus user, the frequency of access requested by a bus user, etc. Moreover, by storing the contents of the request field over time, a processor associated with the bus master can make reasoned decisions as to the granting of access based on recent traffic patterns on the bus. Those skilled in the art will appreciate that the bus users need never be aware of what algorithm is driving the bus master's selection of a bus user's access to the next bus frame. The sequential requesting by bus users and granting by the bus master according to the invention eliminates the need to reconfigure the bus users every time the arbitration procedure is changed. The use of a central bus master with the bus arbitration ability described above enables the rapid change of the operational characteristics of the bus system from a single location without the need to inform any of the bus users.

Examples of bus arbitration algorithms which might be used include a round robin protocol, a modified round robin protocol, a circular priority protocol, a source rate control protocol, etc. In a round robin protocol, bus users are assigned sequential priority numbers and requests are granted in the order of the priority numbers. For example, if bus users 1, 3, 5, and 9 request access during a first frame and bus users 2, 4, and 6 request access in a second frame, they are granted access in the order 1, 2, 3, 4, 5, 6, 9. If, during a third frame, bus user 8 requests access, it will be granted access before bus user 9 is granted access even though bus user 9 was first to request access. After being granted access, the user is placed at the end of the access list. A modified round robin protocol follows the same procedure except that it adds an order of priority based on who requests first. In the above example, access would be granted in the order 1, 3, 5, 9, 2, 4, 6. If, during a third frame, bus user 8 requests access, it is granted access after bus user 6. Again, after being granted access, the user is placed at the end of the access list. The round robin protocol can be implemented using a "circular priority coder" which grants access to bus users according to a predetermined sequential priority. After a bus user has been granted access, it is given the lowest priority and the priority of all other bus users is sequentially advanced one step. Since the bus master alone controls the access of each bus user, any protocol can be used to determine priority of access. As mentioned above, the bus master can consult with bus monitoring devices to exercise a source rate protocol where priority of access is determined according to the number of requests made by each bus user. For example, a bus user which has made frequent requests may be assigned a high priority and a bus user which has made infrequent requests may be assigned a low priority. As the bus activity is monitored, priority assignments can be changed.

There have been described and illustrated herein several embodiments of an asynchronous data transfer and source traffic control system. While particular embodiments of the invention have been described, it is not intended that the invention be limited thereto, as it is intended that the invention be as broad in scope as the art will allow and that the specification be read likewise. Thus, a bus frame width of thirty-two bits has been disclosed, it will be appreciated that other frame configurations could be utilized. Likewise, while the preferred number of cycles of the frame is sixteen, a fifteen cycle frame could also be utilized without departing from the concepts of the invention. Also, while three specific clock buses have been shown, it will be recognized that other types of clock buses could be used with similar results obtained. Moreover, while particular formats have been disclosed in reference to the request field, it will be appreciated that other formats could be used as well. Furthermore, while particular formats have been disclosed in reference to the grant field, it will be appreciated that other formats could be used as well to achieve the same or similar function as disclosed herein. It will therefore be appreciated by those skilled in the art that yet other modifications could be made to the provided invention without deviating from its spirit and scope as so claimed.

I claim:

1. An asynchronous data transfer and source traffic control system, comprising:

a) a bidirectional data bus;

b) a first clock bus having a first clock signal of a first frequency;

c) a bus master bidirectionally coupled to said bidirectional data bus, said bus master also being coupled to said first clock bus;

d) a plurality of bus users bidirectionally coupled to said bidirectional data bus, each of said bus users also being coupled to said first clock bus and receiving said first clock signal, wherein said plurality of bus users are individually granted write access to said bidirectional data bus by said bus master in response to requests made by said plurality of bus users, said requests by said plurality of bus users being made during a request field of a repeating bus frame format and said write access being granted to an individual bus user by said bus master during a grant field of said repeating bus frame format, said repeating bus frame format comprising a predetermined number of cycles of said first clock signal, said predetermined number of cycles defining said request field, a data field, and said grant field, one of said requests made in said request field of a first frame being granted in said grant field of said first frame for write access during said data field of a second frame.

2. The system according to claim 1, wherein:

said bidirectional data bus is thirty-two bits wide.

3. The system according to claim 1, wherein:

said first clock bus is driven by said bus master.

4. The system according to claim 1, wherein:

said repeating bus frame format comprises either fifteen or sixteen cycles of said first clock signal.

5. The system according to claim 4, wherein:

said request field occurs during a first one of said fifteen or sixteen clock cycles and said grant field occurs during a last one of said fifteen or sixteen clock cycles.

6. The system according to claim 1, wherein:

each of said plurality of bus users has a unique request signal within a page, and said bus users make requests during said request field of their page by writing their unique request signals to said bidirectional data bus.

7. The system according to claim 6, wherein:

each of said unique request signals consists of a plurality of binary zeroes and a single binary one.

8. The system according to claim 1, wherein:

said plurality of bus users are arranged according to groups, with each bus user having a group number and a unique request signals within its group.

9. The system according to claim 8, wherein:

said plurality of bus users make requests one group at a time, said grant field including said group identification number identifying which group will make requests next.

10. The system according to claim 6, wherein:

said grant field includes a plurality of bits relating to one of said unique request signals, wherein said one of said unique request signals corresponds to a bit written to said bidirectional data bus during said request field.

11. The system according to claim 1, wherein:

said bus master grants requests according to an arbitration algorithm.

12. The system according to claim 1, wherein:

a predetermined amount of data can be written to said data field, and each of said plurality of bus users make one request for each predetermined amount of data each of said plurality of bus users has to send.

13. The system according to claim 1, further comprising:

e) a clock frame bus having a second clock signal of a second frequency, wherein said bus master and each of said plurality of bus users are coupled to said clock frame bus, and each cycle of said second clock signal indicates a first one of a predetermined number of first clock signals comprising said repeating bus frame format.

14. The system according to claim 13, wherein:

said clock frame bus is driven by said bus master.

15. The system according to claim 1, further comprising:

e) a second clock bus having a second clock signal of a second frequency, said second frequency being higher than said first frequency, wherein each of said plurality of bus users are coupled to said second clock bus, and each of said plurality of bus users writes to said bidirectional data bus at said second frequency.

16. A system according to claim 15, wherein:

said second clock bus is driven by the bus user of said plurality of bus users which has been granted access to said data bus by said bus master.

17. A method for asynchronous data transfer and source traffic control, comprising:

a) coupling a bus master and a plurality of bus users to a bidirectional data bus and a first clock bus;

b) defining a bus frame format for data transfer as a predetermined number of first clock cycles of said first clock bus during which data is written to said bidirectional data bus;

c) defining one of said predetermined number of first clock cycles of said bus frame format as a request field during which bus users having data to send write a request for access to said bidirectional data bus;

d) defining another of said predetermined number of first clock cycles of said bus frame format as a grant field during which said bus master writes a grant for access to said bidirectional data bus identifying a selected one of said bus users having data to send; and e) defining a plurality of said predetermined number of first clock cycles of said bus frame format as data fields during which a previously selected one of said plurality of bus users writes data to said bidirectional data bus, said data fields following said request field and preceding said grant field, wherein said selected one of said bus users having data to send is identified in said grant field of a first frame to be said previously selected one of said plurality of bus users in a second frame.

18. The method according to claim 17, further comprising:

f) coupling a frame clock bus to said bus master and said plurality of bus users; and g) beginning a frame at each clock cycle of said frame clock bus.

19. The method according to claim 17, further comprising:

f) dividing said plurality of bus users into groups and assigning each of said plurality of bus users a unique identification number within its group, wherein said bus users of a particular group having data to send request access during said request field for that group by writing to said bidirectional data bus at least one bit position corresponding to the unique identification number of said bus users, and said bus master grants access during said grant field by writing a plurality of bits corresponding to the unique identification number of said selected one of said bus users to said bidirectional data bus.

20. The method according to claim 17, wherein:

said bus master determined which of said bus users having data to send will be granted access based on an arbitration algorithm.

* * * * *